US006968490B2

(12) United States Patent  (10) Patent No.: US 6,968,490 B2
Tarango et al.  (45) Date of Patent: Nov. 22, 2005

(54) TECHNIQUES FOR AUTOMATIC EYE-DEGRADATION TESTING OF A HIGH-SPEED SERIAL RECEIVER

(75) Inventors: Tony M. Tarango, Folsom, CA (US); Thomas E. Bleakley, Lake Crystal, MN (US)

(73) Assignee: Intel Corporation, Santa Clara, CA (US)

( * ) Notice: Subject to any disclaimer, the term of this patent is extended or adjusted under 35 U.S.C. 154(b) by 412 days.

(21) Appl. No.: 10/383,501

(22) Filed: Mar. 7, 2003

(65) Prior Publication Data

US 2004/0177301 A1 Sep. 9, 2004

(51) Int. Cl.$^7$ ............................................. G06F 11/00
(52) U.S. Cl. .................................. 714/738; 714/715
(58) Field of Search ............................. 714/745, 738, 714/715; 375/222, 285; 725/107; 704/200.1; 324/765

(56) References Cited

U.S. PATENT DOCUMENTS

| | | | | |
|---|---|---|---|---|
| 3,737,637 | A | * | 6/1973 | Frankeny et al. ........... 714/745 |
| 3,869,580 | A | | 3/1975 | Ragsdale |
| 5,734,676 | A | * | 3/1998 | Dingsor ...................... 375/222 |
| 5,751,114 | A | * | 5/1998 | Dingsor ...................... 375/222 |
| 5,761,259 | A | * | 6/1998 | Dingsor ...................... 375/285 |
| 6,215,817 | B1 | | 4/2001 | Kimura |
| 6,269,482 | B1 | * | 7/2001 | Gershfeld ................... 725/107 |
| 6,301,633 | B1 | | 10/2001 | Chapman |
| 6,445,718 | B1 | | 9/2002 | Muto |
| 6,718,296 | B1 | * | 4/2004 | Reynolds et al. ......... 704/200.1 |
| 6,777,971 | B2 | * | 8/2004 | Kirloskar et al. ........... 324/765 |

OTHER PUBLICATIONS

Levitan S. P., et al. Computer Aided Design for Free Space Optical Interconnected Systems, IEEE Lawers and Electro-Optics Society, 1999 Annual Meeting, Leos '99, Nov. 11, 1999, pp. 623-624, XP00282733, San Franscisco, CA.

Tahim, K. S., et al "A Radical Exploration Approach to Manufacturing Yield Estimation and Design Centering" IEEE Transactions on Circuits and Systems. vol. 26, No. 9, Sep. 1979 pp. 768-774, XP001181496 Sections I, II.

Buttle, K. et al. "A Multirate Transceiver IC for Four-Wire Full-Duplex Data Transmission" IEEE Journal of Solid-State Circuits, IEEE Inc. New York, vol. 26, No. 12, Dec. 1991, pp. 1928-1934, XP000272853 ISSN: 0018-9200 Fig. 3.

Haideh, K. et al., "A Highly Efficient CMOS Line Driver with 80-DB Linearty for ISDN U-Interface Applications" IEEE Journal of Solid-State Circuits, IEEE Inc. New York, vol. 27, No. 12, Dec. 1992, pp. 1723-1729, XP000329021 ISSN: 0018-9200 Fig. 1-3.

\* cited by examiner

*Primary Examiner*—David Ton
(74) *Attorney, Agent, or Firm*—Blakely, Sokoloff, Taylor & Zafman LLP

(57) ABSTRACT

Embodiments of the invention relate to techniques for automatic degradation testing of a high-speed serial receiver. A transmitter manipulator couples to a transmitter of a serial interface circuit. The transmitter is coupled to the receiver of the serial interface circuit. The transmitter manipulator includes a storage to store one of current compensation values or impedance compensation values and sequencing logic to dynamically sequence the one of the current compensation values or impedance compensation values to the transmitter. The transmitter responsive to the dynamically sequenced one of the current or impedance compensation values generates a degraded test pattern signal to transmit to the receiver in order to test the receiver.

35 Claims, 4 Drawing Sheets

TECHNIQUES FOR AUTOMATIC EYE-DEGRADATION TESTING OF A HIGH-SPEED SERIAL RECEIVER

FIELD

Embodiments of the invention relate to the field of serial interfaces. More particularly, embodiments of the invention relate to techniques for automatic eye-degradation testing of a high-speed serial receiver.

DESCRIPTION OF RELATED ART

As computer devices and systems continue to advance and become more complex, effective and efficient techniques for transferring data between various components in computer systems have become more and more critical in computer system design and implementation. In particular, techniques to increase data transfer rates between an input/output (I/O) device and a respective interface of a computer system are continuously being developed in order to improve the overall performance of computer systems.

More particularly, there has been a large push in the computer industry to develop serial interfaces that transmit and receive data at ever increasing bit-rates. As is known in the art, a serial interface is used in serial communication between two devices (e.g. between a computer system and an I/O device), in which only one bit is transmitted at a time. For example, computers often include a number of different serial interface ports conforming to a variety of different standards. Serial ports are considered to be general-purpose interfaces that can be used for interfacing with almost any type of device.

However, with the advent of ever increasing serial interface bit-rates, there is a corresponding increasing need for more sophisticated techniques for testing the robustness of these serial interfaces. For example, tolerance to jitter and large voltage amplitude variations are two specific properties of a serial interface that are vital to its performance, but that are very difficult to test since they should be tested at very high speeds and without incurring any penalty to its performance by the test methods being employed. Further complicating the matter, is that typical high-volume manufacturing environments used to test these serial interfaces are not very sophisticated and cannot offer the kind of high-speed analysis required to truly test these properties.

For example, currently, one method of statically testing a serial interface receiver's tolerance for jitter is to inject jitter into a transmitted signal using an external jitter injection module (JIM). The jitter injection module has to be placed on a tester load board, along with the serial interface, and tuned so that it provides a specific amount of jitter to the receiver. In another method, an external pattern generator is used that has the ability to jitter its transmitted pattern to the receiver. Unfortunately, today's methods of testing a serial interface receiver's tolerance for jitter, voltage amplitude variations, and other conditions, are somewhat burdensome involving many different operations and external testing modules.

DESCRIPTION

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention. In other instances details such as, well-known methods, types of data, protocols, procedures, components, electrical structures and circuits, are not described in detail, or are shown in block diagram form, in order not to obscure the invention. Furthermore, embodiments of the invention will be described in particular embodiments but may be implemented in hardware, software, firmware, middleware, or a combination thereof.

Embodiments of the invention relate to techniques for automatic degradation testing of a high-speed serial receiver of a high-speed serial interface circuit. Particularly, a transmitter manipulator included in the high-speed serial interface circuit couples to a transmitter of serial interface circuit. The transmitter is coupled to the receiver of the serial interface circuit. The transmitter manipulator includes a current compensation value storage and an impedance compensation value storage to store current compensation values and/or impedance compensation values, respectively, and sequencing logic to dynamically sequence the current compensation values and/or impedance compensation values to the transmitter. The current compensation values, the impedance compensation values, and the rate at which the sequential logic dynamically sequences these values are all programmable, for example, as part of a testing process. The transmitter responsive to the dynamically sequenced current and/or impedance compensation values generates a degraded test pattern signal to transmit to the receiver in order to test the receiver.

Figure 1:
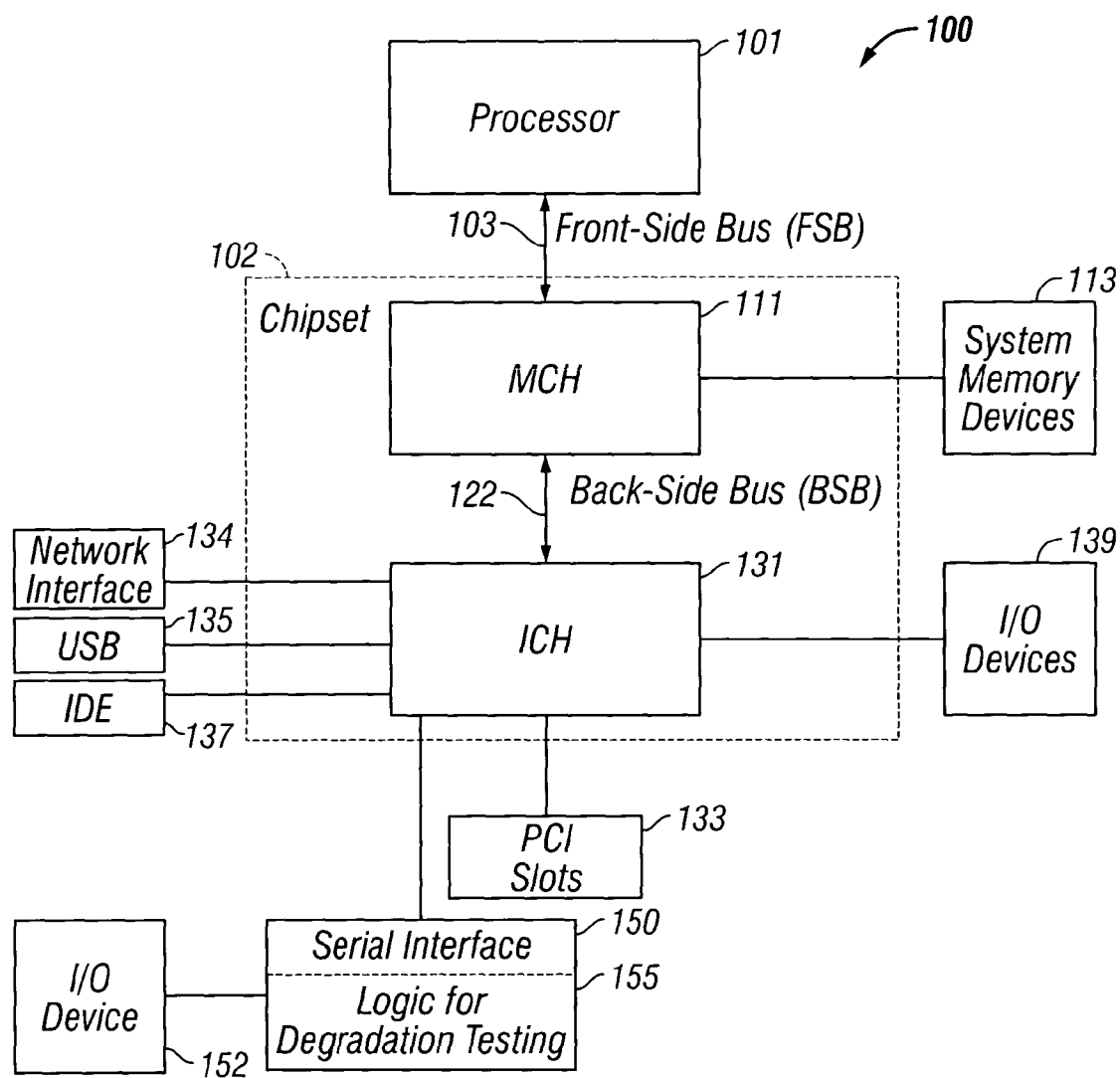
FIG. 1 shows a partial block diagram of an example of a computer system configuration having a high-speed serial interface.

FIG. 1 shows a partial block diagram of an example of a computer system configuration having a high-speed serial interface. The system configuration 100 includes at least one processor 101 such as a central processing unit (CPU), a memory control hub (MCH) 111, system memory devices 113, and an Input/Output (I/O) control hub (ICH) 131. The combination of the MCH 111 and ICH 131 is sometimes termed a chipset 102. The chipset 102 may be one or more integrated circuit chips that acts as a hub or core for data transfer between the processor and other components of the computer system 100. Further, the computer system may include additional components (not shown) such as a co-processor, modem, etc.—this being only a very basic example of a computer system.

The CPU 101 is coupled to the MCH 111 by the front-side bus (FSB) 103 and the MCH 111 is coupled to the ICH 131 by a hub link 122 (sometimes referred to as the back-side bus). The MCH 111 performs functions often termed "north-bridge functionality"; and the ICH 131 performs functions often termed "southbridge functionality."

For the purposes of the present specification, the term "processor" or "CPU" refers to any machine that is capable of executing a sequence of instructions and shall be taken to include, but not be limited to, general purpose microprocessors, special purpose microprocessors, application specific integrated circuits (ASIC), multi-media controllers, signal processors and microcontrollers, etc. In one embodiment, the CPU 101 is a general-purpose microprocessor that is capable of executing an Intel Architecture instruction set. For example, the CPU 101 can be one of the PENTIUM classes of processors or one of the CELERON classes of processors.

The CPU 101, the ICH 131, and other components access the system memory devices 113 via the MCH 111. The MCH 111, in one embodiment, is responsible for servicing all memory transactions that target the system memory devices 113. The MCH 111 can be a stand-alone unit, an integrated part of a chipset, or a part of some larger unit that controls the interfaces between various system components and the system memory devices 113.

The system memory devices 113 can include any memory device adapted to store digital information, such as static random access memory (SRAM), dynamic random access memory (DRAM), synchronous dynamic random access memory (SDRAM), and double data rate (DDR) SDRAM or DRAM, etc. Thus, in one embodiment, system memory devices 113 include volatile memory. Further, system memory devices 113 can also include non-volatile memory such as read-only memory (ROM) (e.g. including basic input/output system (BIOS) ROM).

The ICH 131 provides the interface control between the MCH 111 and various I/O devices, interfaces, and ports which may include peripheral component interconnect (PCI) slots and PCI agents 133, a network interface 134 to communicate with a network using a standard network protocol, at least one USB port 135, at least one integrated drive electronic (IDE) interface 137 (e.g. for a hard drive), and at least one high-speed serial interface 150 having at least one I/O device 152 coupled thereto. Further, other I/O devices 139 may be coupled to the ICH 131 through the previously described interfaces or other types of interfaces. It should be appreciated that there are a wide variety of different types of I/O devices. Examples of I/O devices may include any I/O devices to perform I/O functions. For example, I/O devices may include a monitor, a keypad, a modem, a printer, storage devices (e.g. Compact Disk ROM (CD ROM), Digital Video Disk (DVD), hard drive, floppy drive, etc.) or any other types of I/O devices, e.g., controllers for input devices (mouse, trackball, pointing device), media cards (e.g. audio, video, graphics), etc.

The serial interface 150 may be a type of high-speed serial interface. Examples of different types of high-speed serial interfaces include high-speed serial interfaces such as Serial Advanced Technology Attachment (SATA) type interfaces, Peripheral Component Interconnect (PCI) Express type interfaces, etc. It should be appreciated that the high-speed serial interface 150 may be compatible with any type of high-speed serial interface. Further, the high-speed serial interface 150 includes logic for implementing techniques for automatic eye-degradation testing of the receiver of the serial interface, as will be discussed in more detail later.

It should be appreciated by those skilled in the art that the FIG. 1 computer system configuration 100 is only one example of a basic computer system. Further, those skilled in the art will recognize that the exemplary environment illustrated in FIG. 1 is not intended to limit the embodiments of the invention.

While aspects of the invention and various functional components will now be described in particular embodiments, it should be appreciated these aspects and functionalities can be implemented in hardware, software, firmware, middleware or a combination thereof.

Embodiments of the invention relate to techniques for automatic degradation testing of a high-speed serial receiver of a high-speed serial interface circuit. Particularly, a transmitter manipulator included in the high-speed serial interface circuit couples to a transmitter of the serial interface circuit. The transmitter is coupled to the receiver of the serial interface circuit. The transmitter manipulator includes a current compensation value storage and an impedance compensation value storage to store current compensation values and/or impedance compensation values, respectively, and sequencing logic to dynamically sequence the current compensation values and/or impedance compensation values to the transmitter. The current compensation values, the impedance compensation values, and the rate at which the sequential logic dynamically sequences these values are all programmable, for example, as part of a testing process. The transmitter responsive to the dynamically sequenced current and/or impedance compensation values generates a degraded test pattern signal to transmit to the receiver in order to test the receiver.

Particularly, embodiments of the invention relate to techniques for automatic degradation testing of a high-speed serial receiver of a high-speed serial interface. Furthermore, as described herein, embodiments of the invention relate to a method and respective architecture used to implement an automatic eye-degradation testing technique used for margining a high-speed serial receiver, in order to test the receiver. These techniques are accomplished by manipulating the transmitter's current and impedance compensation mechanisms to stress the time and amplitude characteristics of a transmitted serial bit stream test pattern signal, which can be used to margin a serial interface receiver's tolerance to jitter and amplitude variation (e.g. voltage swings).

Figure 2:
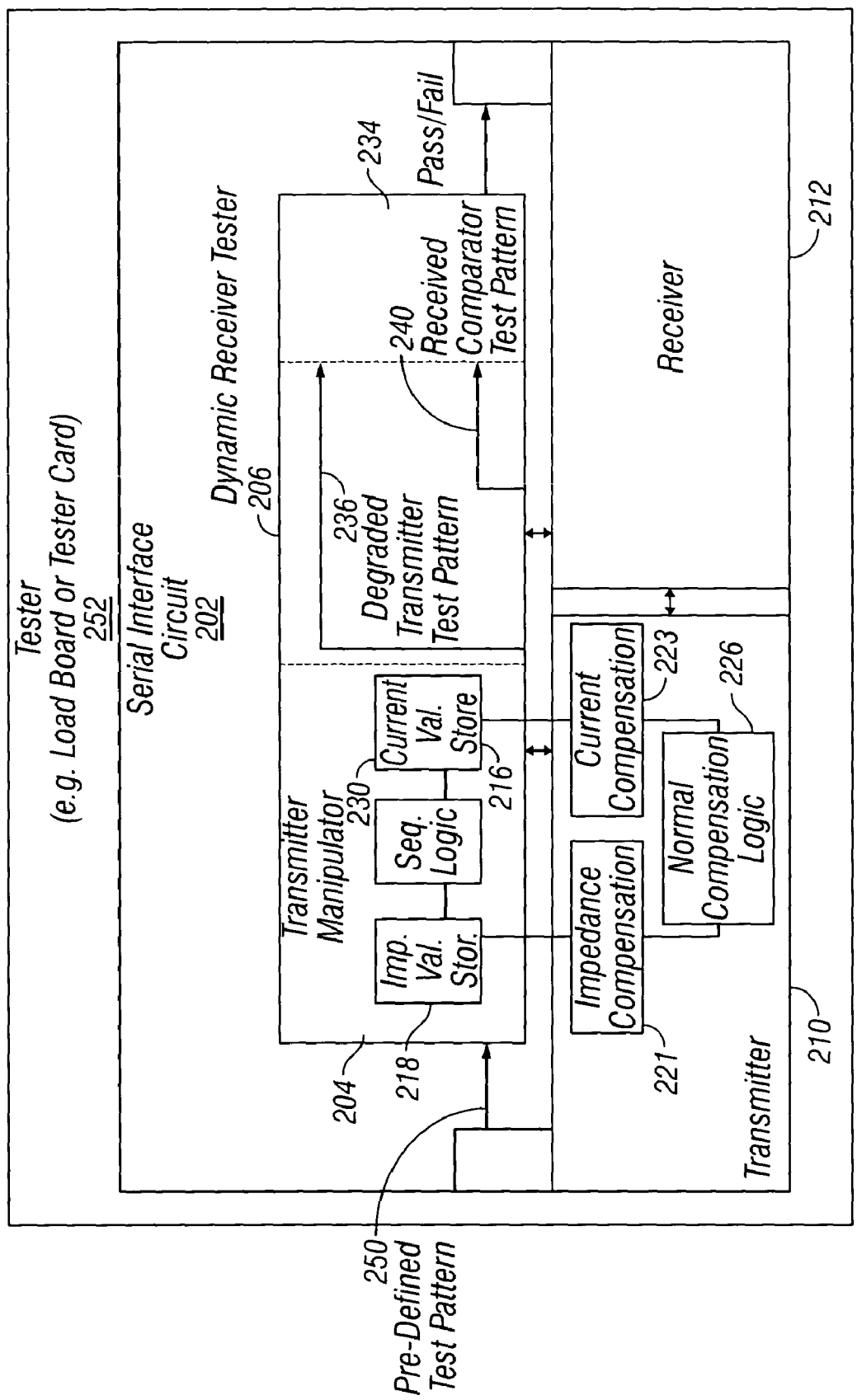
FIG. 2 is a block diagram illustrating an example of an architecture, which may be utilized to implement the techniques for automatic degradation testing of a high-speed serial interface receiver, according to one embodiment of the invention.

With reference now to FIG. 2, FIG. 2 is a block diagram illustrating an example of an architecture, which maybe utilized to implement the techniques for automatic degradation testing of a high-speed serial interface receiver, according to one embodiment of the invention. As shown in FIG. 2, in one embodiment, a transmitter manipulator 204, optionally included in a dynamic receiver tester mechanism 206, may be integrated into a high-speed serial interface circuit 202. The high-speed serial interface circuit 202 includes a high-speed transmitter 210 for transmitting data and a high-speed receiver 212 for receiving data.

As shown in FIG. 2, the transmitter manipulator 204 is coupled to the transmitter 210 of the serial interface circuit 202. Further, the transmitter 210 is both directly coupled to the receiver 212 of the serial interface circuit 202 and is also coupled to the receiver 212 through the dynamic receiver tester 206.

Looking particularly at the transmitter manipulator 204, the transmitter manipulator 204 includes a storage to store either one or both of current compensation values or impedance compensation values. Particularly, in one embodiment, the transmitter manipulator 204 includes a current compensation value storage 216 to store current compensation values and an impedance compensation value storage 218 to store impedance compensation values. These impedance and current compensation values may be directly coupled to the compensation logic of the transmitter 210. Particularly, the impedance compensation values stored in the impedance compensation values storage 218 may be coupled to the impedance compensation circuit 221 of the transmitter 210 and the current compensation values stored in the current compensation values storage 216 may be coupled to the current compensation circuit 223 of the transmitter 210. In this way, the transmitter manipulator 204 bypasses the normal compensation logic 226 of the transmitter 210.

The transmitter manipulator further includes sequencing logic 230 to dynamically sequence either one of or both of the current compensation values and/or impedance compensation values to the transmitter 210. The impedance compensation values being routed to the impedance compensation circuit 221 of the transmitter 210 and the current compensation values being routed to the current compensation circuit 223 of the transmitter 210. As will be discussed in more detail later, the transmitter 210 in response to the dynamically sequenced current compensation values and/or impedance compensation values generates a degraded test pattern signal to transmit to the receiver 212 in order to test the receiver. In one embodiment, the degraded test pattern signal forms an eye-shaped degraded test pattern signal.

In one embodiment, as shown in FIG. 2, the dynamic receiver tester 206 includes a comparator 234. Utilizing the transmitter manipulator 204, the sequence logic 230 may dynamically sequence sequential current compensation values and impedance compensation values to the existing impedance compensation circuit 221 and the existing current compensation circuit 223 of the transmitter 210, respectively, bypassing the normal compensation logic 226, in order to control the strength and the impedance of a degraded transmitter test pattern signal, which is transmitted to the receiver in order to test the receiver. It should be appreciated that the current compensation values, the impedance compensation values, and the rate at which the sequential logic dynamically sequences these values are all programmable, for example, as part of a testing process. For example, the jitter frequency may be controlled by the sequencing rate programmed into the sequencing logic 230.

The degraded transmitter test pattern signal is also sent directly to the comparator 234. In this way, the comparator 234 can compare the degraded transmitter test pattern signal 236 sent directly from transmitter 210 to the received degraded test pattern signal 240, actually received by the receiver 212, in order to test whether the receiver 212 can accurately read the serial data being sent to it.

Although FIG. 2 shows the comparator 234 as being part of the dynamic receiver tester 206, and both the degraded transmitter test pattern signal 236 and the received degraded test pattern signal 240 being routed though the dynamic receiver tester 206, it should be appreciated that this functionality including the comparator and the routing of the test patterns may be included in other portions of the serial interface circuit 202 or tester equipment (e.g. a load board or tester card).

The impedance compensation values, current compensation values, and the sequencing logic rate may be part of a pre-defined test pattern 250 sent to the transmitter manipulator 204 from testing equipment in order to test the receiver 212 of the serial interface circuit 202. The pre-defined test pattern 250 may include impedance compensation values for storage in the impedance compensation value storage 218 and/or current compensation values for storage in the current compensation value storage 216, as well as a sequencing rate. As previously discussed, these compensation values may then be dynamically sequenced by the sequencing logic 230 to the transmitter's current and impedance compensation circuits 221 and 223, respectively, to generate a degraded transmitted test pattern (e.g. an eye-shaped degraded test pattern) in order to test the receiver 212.

For example, in FIG. 2, the serial interface circuit 202 is shown as being tested on a tester 252 (e.g. a load board or tester card). The tester 252 may generate pre-defined test patterns 250 in order to test the receiver 212. For example, the receiver 212 of the serial interface circuit 202 may be tested for either design validation or during high-volume manufacturing, as a test screen.

Figure 3:
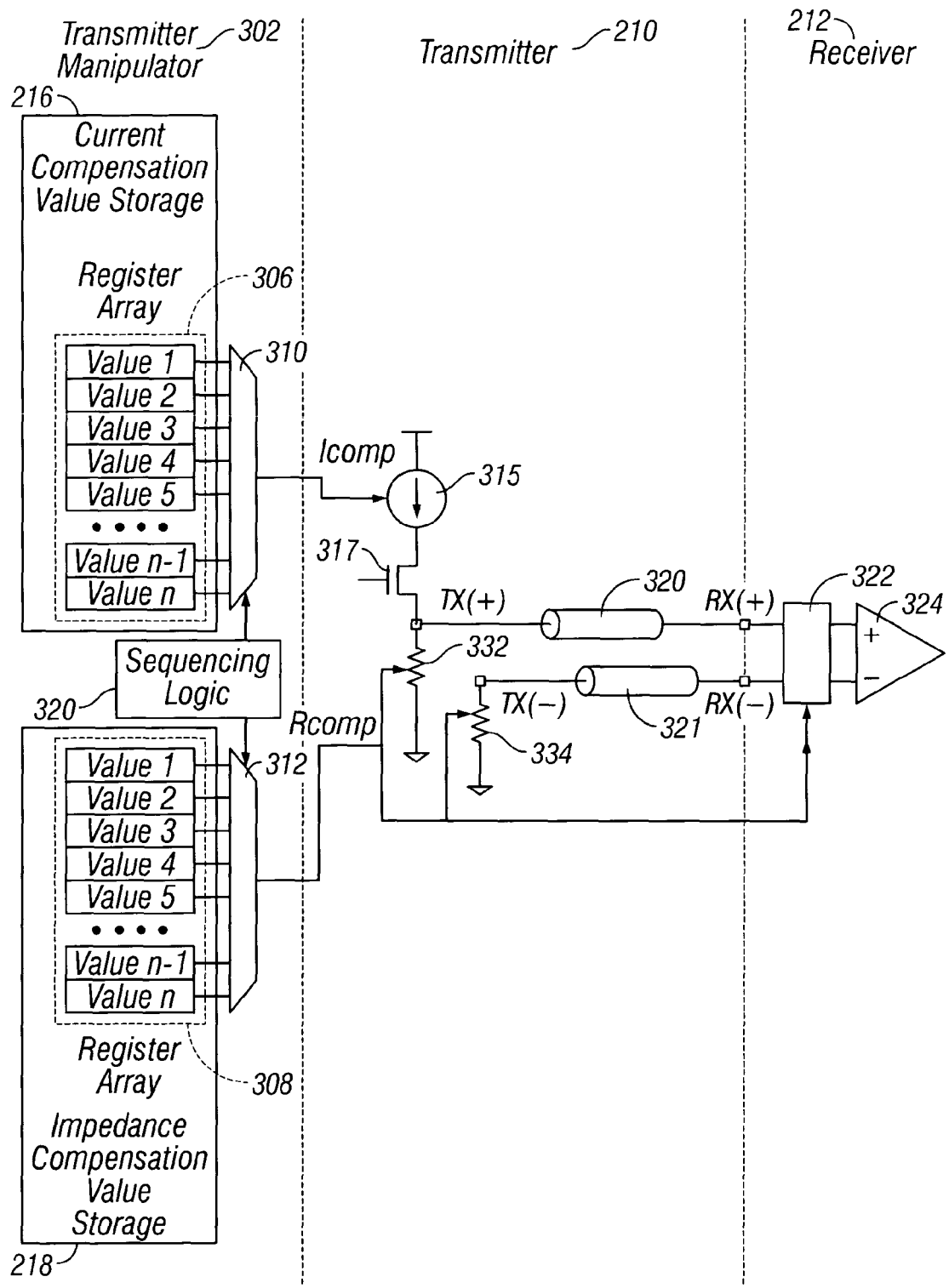
FIG. 3 is a schematic diagram showing a more particular example of a transmitter manipulator, and its relation to a transmitter and receiver, according to one embodiment of the invention.

With reference now to FIG. 3, FIG. 3 is a schematic diagram, which shows a more particular example of a transmitter manipulator, and its relation to the transmitter and receiver, according to one embodiment of the invention. As shown in FIG. 3, the transmitter manipulator 302 includes a current compensation value storage 216, which includes a current compensation value register array 306 for storing current compensation values 1-n, and an impedance compensation value storage 218, which includes an impedance compensation value register array 308 for storing impedance compensation values 1-n. Further, each of the registers of each of the current compensation value register array 306 and the impedance compensation value register array 308 are each coupled to a multiplexer, multiplexer 310 and multiplexer 312, respectively. In turn, sequencing logic 320 is coupled to each of the multiplexers 310 and 312 in order to dynamically sequence (at a pre-programmed rate) either one of both of the current and/or impedance compensation values from the transmitter manipulator 302 to the current and impedance compensation circuits of the transmitter 210, respectively. In this way, a degraded test pattern signal is generated by the transmitter 210 for transmission to the receiver 212 in order to test the receiver.

Particularly, the current compensation values of the current compensation register array 306 are dynamically sequenced to the transmit current source 315 (i.e. Icomp) of the transmitter 210. Responsive to the dynamically sequenced current compensation values, the transmit current source 315 generates a current-based degraded test pattern signal, which through the transmitting switching transistor 317 and through wire 320 is sent to the receiver termination block 322 and the differential amplifier 324 of the receiver 212.

Similarly, in addition to or instead of the current compensation values, impedance or resistance compensation values may be dynamically sequenced from the impedance compensation value register array 308 to variable resistors 332 and 334 (i.e. termination resistors) of the transmitter 210. By dynamically sequencing the impedance compensation values to adjust the variable resistors 332 and 334 (i.e. Rcomp), degraded test pattern signals (e.g. eye-shape degraded test pattern signals) may be sent through wires 320 and 321 to the receiver termination 322 and the differential amplifier 324 of the receiver 212. Further, the impedance compensation values may also be directly routed to the receiver termination 322 in order to ensure that there are not impedance mismatches.

Accordingly, in the embodiment shown in FIG. 3, values for a pre-defined test pattern may be programmed into one or both of the current compensation value register array 306 and/or the impedance compensation value register array 308, respectively, which corresponds to a sequence of current and/or resistance values to be applied dynamically to the transmitter current source 315 and/or the transmitter termination resistors 332 and 334, respectively. Particularly, the sequencing logic 320, through respective multiplexers 310 and 312, at a pre-programmed sequencing rate, causes the dynamic application of these current compensation values and/or impedance compensation values to the transmitter current source 315 and/or termination resistors 332 and 334, respectively, bypassing the normal compensation logic of the transmitter 210. It should be noted that this technique can be used for a variety of transmitter designs as long as they contain a variable current source and a variable transmitter impedance.

The effect of cycling through the current and/or impedance values at pre-defined sequencing rates is that the transmit signals slew/rate and voltage level is manipulated in order to generate a degraded test pattern signal.

Figure 4:
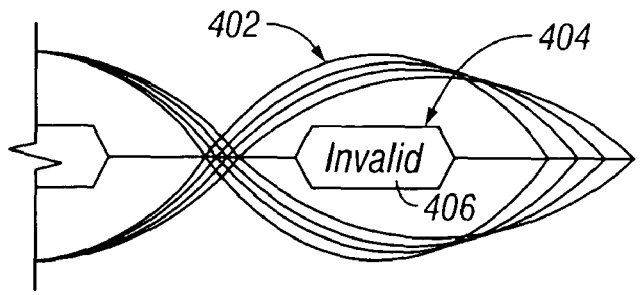
FIG. 4 is a simplified graph illustrating the manipulation of a transmitter signal's slew/rate and voltage level by automatic degradation testing techniques, according to one embodiment of the invention.

Turning now to FIG. 4, FIG. 4 is a simplified graph illustrating the manipulation of a transmitter signal's slew/rate and voltage level by the automatic eye-degradation testing techniques, as previously discussed. Edges on the transmitted signal 402 will either be pushed out or pulled in and maximum voltage levels will rise or fall, depending on whether the compensation values for the current and/or impedance are increased or decreased. Over time, this causes the eye 404 of the transmit signal 402 to degrade both in the vertical direction (voltage) and in the horizontal direction (time). However, if the current and/or resistance values are altered too much, the transmitted signal 402 will be degraded to the point that it enters the invalid region 406, which is a region in which the receiver cannot accurately sample the serial data (i.e. distinguish a "1" from a "0").

Figure 5A:
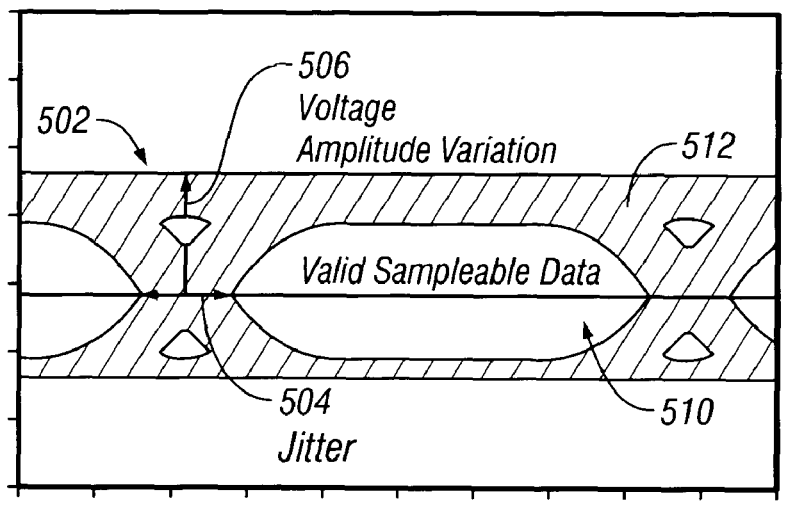
FIG. 5A is a graphical representation of a transmitter test pattern signal sent to a receiver without automatic eye-degradation.

With reference now to FIG. 5A, FIG. 5A is a graphical representation of a transmitter test pattern signal sent to a receiver without automatic eye-degradation. As shown in FIG. 5A, the transmitted signal from the transmitter to the receiver has a nominal amount of jitter 504 (approximately 113 pico-seconds) and a nominal amount of voltage amplitude variation 506. Thus, the test pattern signal 502 from the transmitter has a large eye 510 of valid sampleable data. The gray area 512 outside of the eye 510 of sampleable data is not sampleable by the receiver. It should be appreciated that in this case the techniques for automatic eye-degradation testing, as previously discussed, have not been employed.

Figure 5B:
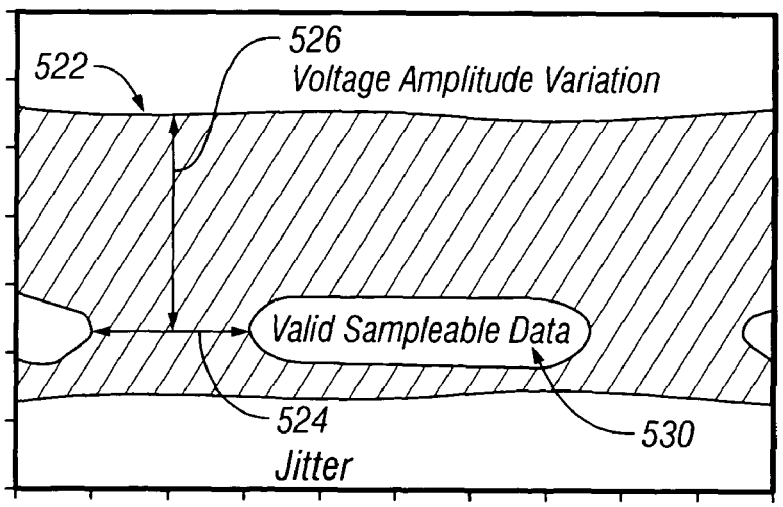
FIG. 5B is a graphical representation of a degraded transmitter test pattern signal sent to a receiver by a transmitter that has been degraded utilizing the techniques for automatic eye-degradation testing, wherein the degraded transmitter test pattern signal forms an eye-shaped degraded test pattern signal, according to one embodiment of the invention.

On the other hand, turning now to FIG. 5B, FIG. 5B is a graphical representation of a degraded transmitter test pattern signal sent to the receiver by the transmitter that has been degraded utilizing the techniques for automatic eye-degradation, as previously discussed, wherein the degraded transmitter test pattern signal forms an eye-shaped degraded test pattern signal, according to one embodiment of the invention. In this particular instance, the eye-shaped degraded test pattern of FIG. 5B, was created as previously discussed, by dynamically sequencing current compensation values to the transmitter current source in order to create the eye-shaped degraded test pattern 522.

As can be clearly seen, the eye-shaped degraded test pattern signal includes almost twice the amount of jitter 524 (approximately 200 pico-seconds) as the normal test pattern signal of FIG. 5A and almost four times the amount of voltage amplitude variation 526 as the normal test pattern signal of FIG. 5A. Thus, the eye 530 of valid sampleable data is much smaller. Utilizing this eye-shaped degraded test pattern signal that is sent to the receiver, the receiver can be tested to see if it can still sample the serial data (i.e. be able to distinguish a "1" from a "0") being transmitted to it from the transmitter (i.e. the receiver passes), or whether with this amount of jitter and voltage amplitude variation accompanying the eye-shaped degraded test pattern signal is such that the receiver cannot sample the transmitted data (i.e. the receiver fails). This is accomplished, as previously discussed, by comparing the received test pattern signal from the receiver to the degraded transmitter test pattern signal sent by the transmitter to determine whether the receiver can accurately read the data (i.e. whether the receiver passes or fails).

There are some variations that can be employed in the previously described techniques for automatic eye-degradation testing of a serial receiver. However, first of all, it should be noted that in the testing process there should be some understanding of what the nominal values are for the normal current and resistance compensation levels, such that appropriate current compensation values and/or impedance compensation values can be programmed into the current and impedance compensation value storages. An alternative method would be to use current and/or impedance offset values, as the compensation values, which could then be added to the normal compensation values of the receiver's normal compensation logic, instead of overriding them. Also, as previously discussed, it should be appreciated that any combination of current and/or impedance compensations values may be used. Both can be used simultaneously or only one can be employed. For example, in the examples of FIGS. 5A and 5B, these examples illustrate only the manipulation of the current compensation values. Moreover, it should be appreciated that the update rate of the sequencing logic can be varied to obtain a variety of different jitter frequencies.

Referring back to FIG. 2, in order to implement the techniques for automatic eye-degradation testing of a high-speed serial receiver, a standard loop-back test is preformed on the serial interface circuit 202. Basically, a pre-defined test pattern defined by current compensation values and/or impedance compensation values programmed into the current compensation value storage 216 and the impedance compensation value storage 218, respectively, of the transmitter manipulator 204, along with a pre-programmed sequencing rate programmed into the sequencing logic 230, is sent out to the current compensation circuit 223 and/or impedance compensation circuit 223 of the transmitter 210 in order to manipulate the transmitter. Based on this, the transmitter 210 generates an eye-shaped degraded test pattern signal that is sent to the receiver 212 and the transmitter's degraded test pattern signal 236 is also sent to a comparator 234. The comparator 234 also receives the received test pattern signal 240 from the receiver 212. The comparator then compares the received test pattern signal 240 to the degraded transmitter test pattern signal 236 originally sent in order to determine whether the receiver can accurately sample the serial data (i.e. whether the receiver can distinguish between "1's" and "0's" in the serial data bit stream). If it can, the receiver 212 passes. If not, the receiver 212 fails.

These tests can be used in a design validation to determine how much jitter and/or voltage amplitude variation a receiver can tolerate by varying the automatic eye-degradation test pattern signal until a failure of the receiver is detected. It could also be used in a high-volume manufacturing testing environment whereby a specific jitter condition and/or voltage amplitude variation is replicated with the techniques for automatic eye-degradation testing, previously discussed. Chips having serial interfaces with receivers that cannot meet a particular jitter signature and/or voltage amplitude variation would fail the automatic eye-degradation test and could then be screened-out.

This testing can be accomplished using well-known means. For example, a serial interface circuit 202 can be tested utilizing a tester 252 (e.g. a load board or a tester card) as part of a high-volume manufacturing environment or a design validation test. Alternatively, a serial interface circuit 252 can be tested as part of a computer system under the control of processor and a chip set having an input/output control hub (ICH). In this instance, the computer system itself can make the determination as to whether the serial interface passes or fails the auto eye-degradation test. Also, it should be appreciated that the logic for the loop-back testing of the comparator comparing the degraded transmitter test pattern signal and the received test pattern signal received by the receiver does not have to be part of the dynamic tester 206, but may be performed by other components of the serial interface circuit 202 or by the tester 252.

As previously discussed, present day methods for testing a receiver's tolerance for jitter is to inject jitter into a transmitted signal using a jitter injection model (JIM). These devices have to be placed on a tester (e.g. a load board) and turned so that they provide a specific amount of jitter. The techniques for automatic eye-degradation testing provides several advantages over the traditional JIM method. Particularly, the techniques for automatic eye-degradation testing, including the use of a transmitter manipulator 204, do not require any external components, which simplifies the tester 252 (e.g. load board or tester card) design and further minimizes the amount of control required for the tester. This not only saves the cost of a jitter injection module on the tester 252, but is also allows the tester 252 to use its limited tester channels for testing the chip as opposed to controlling the jitter injection module.

Further, the techniques for automatic eye-degradation testing, utilizing the transmitter manipulator 204, allows for a variety of tuning through the programming of the current impedance compensation values and/or the impedance compensation values into the current compensation value storage and/or the impedance value compensation storage, respectively, and/or through the manipulation of the update rate of the sequencing logic. This is a feature that current jitter injection modules do not provide. And further, even if they did, they would still require even more control from the tester.

Additionally, the techniques for automatic eye-degradation testing, utilizing a transmitter manipulator 204 that is part of the serial interface itself, will become more and more important in the future as serial interface products having interface frequencies that are ever higher and higher begin to outpace current external test equipment's ability to statically test for jitter as they currently do. The transmitter manipulator 204 allows for the dynamic testing of jitter and/or voltage amplitude variations in a dynamic fashion and in a programmable fashion such that it can keep pace with the ever increasing speed of serial interface products for testing purposes.

Moreover, while aspects of the invention and various functional components have been described in particular embodiments, it should be appreciated these aspects and functionalities can be implemented in hardware, software, firmware, middleware or a combination thereof.

While embodiments of the invention have been described with reference to illustrative embodiments, these descriptions are not intended to be construed in a limiting sense. Various modifications of the illustrative embodiments, as well as other embodiments of the invention, which are apparent to persons skilled in the art to which embodiments of the invention pertain, are deemed to lie within the spirit and scope of the invention.

What is claimed is:

1. An apparatus comprising:
   a transmitter manipulator to couple to a transmitter of a serial interface circuit, the transmitter to couple to a receiver of the serial interface circuit, the transmitter manipulator further including,
      a storage to store one of current compensation values or impedance compensation values, and
      sequencing logic to dynamically sequence the one of the current compensation values or impedance compensation values to the transmitter;
   wherein the transmitter responsive to the dynamically sequenced one of the current or impedance compensation values generates a degraded test pattern signal to transmit to the receiver in order to test the receiver.

2. The apparatus of claim 1, wherein, the degraded test pattern signal forms an eye-shaped degraded test pattern signal.

3. The apparatus of claim 1, wherein, the storage comprises a register array.

4. The apparatus of claim 1, wherein, the current compensation values are coupled to a current compensation circuit of the transmitter.

5. The apparatus of claim 1, wherein, the impedance compensation values are coupled to an impedance compensation circuit of the transmitter.

6. The apparatus of claim 1, wherein, the storage comprises:
   a current compensation value storage to store the current compensation values; and
   an impedance compensation value storage to store the impedance compensation values.

7. The apparatus of claim 6, wherein, the sequencing logic is to dynamically sequence the current compensation values and the impedance compensation values to the transmitter, wherein the transmitter responsive to the dynamically sequenced current and impedance compensation values generates a degraded test pattern signal to transmit to the receiver in order to test the receiver.

8. The apparatus of claim 7, wherein, the degraded test pattern signal forms an eye-shaped degraded test pattern signal.

9. The apparatus of claim 7, wherein, the current compensation value storage and the impedance compensation value storage each comprise register arrays, respectively.

10. The apparatus of claim 7, wherein, the current compensation values are coupled to a current compensation circuit of the transmitter.

11. The apparatus of claim 7, wherein, the impedance compensation values are coupled to an impedance compensation circuit of the transmitter.

12. The apparatus of claim 7, further comprising a comparator, the comparator to compare the degraded test pattern signal transmitted to the receiver by the transmitter to a received test pattern signal received by the receiver in order to test the receiver.

13. A method comprising:
storing one of current compensation values or impedance compensation values;
dynamically sequencing the one of the current compensation values or impedance compensation values to a transmitter of a serial interface circuit;
generating a degraded test pattern signal based on the dynamically sequenced one of the current compensation values or impedance compensation values; and
transmitting the degraded test pattern signal to a receiver of the serial interface circuit in order to test the receiver.

14. The method of claim 13, wherein, the degraded test pattern signal forms an eye-shaped degraded test pattern signal.

15. The method of claim 13, further comprising, coupling the current compensation values to a current compensation circuit of the transmitter.

16. The method of claim 13, further comprising, coupling the impedance compensation values to an impedance compensation circuit of the transmitter.

17. The method of claim 13, wherein, storing one of current compensation values or impedance compensation values, further comprises, storing both the current compensation values and the impedance compensation values.

18. The method of claim 17, further comprising,
dynamically sequencing both of the current compensation values and the impedance compensation values to the transmitter to generate a degraded test pattern signal; and
transmitting the degraded test pattern signal to the receiver in order to test the receiver.

19. The method of claim 18, wherein, the degraded test pattern signal forms an eye-shaped degraded test pattern signal.

20. The method of claim 18, further comprising, comparing the degraded test pattern signal transmitted to the receiver by the transmitter to a received test pattern signal received by the receiver in order to test the receiver.

21. A serial interface circuit comprising:
a transmitter;
a receiver;
a transmitter manipulator to couple to the transmitter, the transmitter to couple to the receiver, the transmitter manipulator further including,
a storage to store one of current compensation values or impedance compensation values, and
sequencing logic to dynamically sequence the one of the current compensation values or impedance compensation values to the transmitter;
wherein the transmitter responsive to the dynamically sequenced one of the current or impedance compensation values generates a degraded test pattern signal to transmit to the receiver in order to test the receiver.

22. The serial interface circuit of claim 21, wherein, the degraded test pattern signal forms an eye-shaped degraded test pattern signal.

23. The serial interface circuit of claim 21, wherein, the storage comprises a register array.

24. The serial interface circuit of claim 21, wherein, the current compensation values are coupled to a current compensation circuit of the transmitter.

25. The serial interface circuit of claim 21, wherein, the impedance compensation values are coupled to an impedance compensation circuit of the transmitter.

26. The serial interface circuit of claim 21, wherein, the storage comprises:
a current compensation value storage to store the current compensation values; and
an impedance compensation value storage to store the impedance compensation values.

27. The serial interface circuit of claim 26, wherein, the sequencing logic is to dynamically sequence the current compensation values and the impedance compensation values to the transmitter, wherein the transmitter responsive to the dynamically sequenced current and impedance compensation values generates a degraded test pattern signal to transmit to the receiver in order to test the receiver.

28. The serial interface circuit of claim 27, wherein, the degraded test pattern signal forms an eye-shaped degraded test pattern signal.

29. The serial interface circuit of claim 27, wherein, the current compensation value storage and the impedance compensation value storage each comprise register arrays, respectively.

30. The serial interface circuit of claim 27, wherein, the current compensation values are coupled to a current compensation circuit of the transmitter.

31. The serial interface circuit of claim 27, wherein, the impedance compensation values are coupled to an impedance compensation circuit of the transmitter.

32. The serial interface circuit of claim 27, further comprising a comparator, the comparator to compare the degraded test pattern signal transmitted to the receiver by the transmitter to a received test pattern signal received by the receiver in order to test the receiver.

33. The serial interface circuit of claim 27 being coupled to a chipset of a computer system.

34. The serial interface circuit of claim 33, wherein, the chipset includes a Memory Control Hub (MCH) and an Input/Output Control Hub (ICH), the serial interface being coupled to the ICH.

35. The serial interface circuit of claim 33, wherein, the chipset is coupled to a processor by a Front-Side Bus (FSB).

* * * * *